US006692200B2

(12) United States Patent
Peterson

(10) Patent No.: US 6,692,200 B2
(45) Date of Patent: Feb. 17, 2004

(54) ALIGNMENT SYSTEM FOR HAND-HELD TOOLS

(75) Inventor: Francis C. Peterson, Spooner, WI (US)

(73) Assignee: Nesson Enterprises, River Forest, IL (US)

( * ) Notice: Subject to any disclaimer, the term of this patent is extended or adjusted under 35 U.S.C. 154(b) by 163 days.

(21) Appl. No.: 10/010,358

(22) Filed: Nov. 13, 2001

(65) Prior Publication Data

US 2002/0164217 A1 Nov. 7, 2002

Related U.S. Application Data

(63) Continuation-in-part of application No. 09/760,634, filed on Jan. 16, 2001, now abandoned.
(60) Provisional application No. 60/288,251, filed on May 2, 2001.

(51) Int. Cl.[7] .......................... B23B 35/00; B23B 45/02
(52) U.S. Cl. .......................... 408/1 R; 408/16; 362/119
(58) Field of Search ................ 408/16, 1 R; 33/DIG. 3; 356/139.1; 362/119, 311

(56) References Cited

U.S. PATENT DOCUMENTS

| | | | | |
|---|---|---|---|---|
| 3,707,330 A | | 12/1972 | Pine | 356/153 |
| 3,728,027 A | | 4/1973 | Watanabe | 356/13 |
| 3,801,205 A | | 4/1974 | Eggenschwyler | 346/138 |
| 4,074,104 A | * | 2/1978 | Fulkerson | 219/121.69 |
| 4,078,869 A | | 3/1978 | Honeycutt | 408/16 |
| 5,052,112 A | | 10/1991 | MacDonald | 33/263 |
| 5,148,232 A | | 9/1992 | Duey et al. | 356/152 |
| 5,810,841 A | | 9/1998 | McNeirney et al. | 606/130 |
| 6,375,395 B1 | * | 4/2002 | Heintzeman | 408/16 |
| 6,565,227 B1 | * | 5/2003 | Davis | 362/119 |

FOREIGN PATENT DOCUMENTS

| | | | | |
|---|---|---|---|---|
| DE | 3405498 A1 | * 10/1984 | | 408/16 |
| DE | 100 13 943 A1 | 3/2001 | | |
| JP | 05309508 A | * 11/1993 | | 408/16 |

OTHER PUBLICATIONS

International Search Report for International Application No. PCT/US 02/34586, mailed on Feb. 28, 2003.

* cited by examiner

*Primary Examiner*—Daniel W. Howell
(74) *Attorney, Agent, or Firm*—Fitch, Even, Tabin & Flannery

(57) ABSTRACT

A system for aligning the bit of a hand-held tool with the surface of a workpiece wherein a laser beam essentially parallel to the axis of the bit is projected forwardly toward the workpiece and onto a mirror maintained at a preselected angle to the workpiece surface. The incident beam is reflected backwardly onto means detecting both the incident beam and the reflected beam and indicating when the beams are coincident.

2 Claims, 2 Drawing Sheets

ALIGNMENT SYSTEM FOR HAND-HELD TOOLS

CROSS REFERENCE TO RELATED APPLICATIONS

This is a utility patent based on provisional U.S. Patent Application Ser. No. 60/288,251 filed May 2, 2001, and is a continuation-in-part of U.S. patent application Ser. No. 09/760,634 filed Jan. 16, 2001 now abandoned.

FIELD OF THE INVENTION

The present invention relates, generally, to alignment systems for hand-held tools, and, more particularly, to alignment systems for a hand-held tool having an axial bit to be aligned with a workpiece.

BACKGROUND OF THE INVENTION

It is difficult, especially for amateurs, to align the bit of a hand-held tool with the surface of a workpiece. Usually, the bit is desirably aligned at a 90° angle to the planar surface of a workpiece, that is, normal to the surface. Various devices have been produced to assist the user in aligning such a tool, one of which is an appliance comprising a cradle in which an electric drill is clamped. Rods connect the cradle to a plate or annular ring which is held against the workpiece. Usually the plate or ring is at right angles to the axis of the bit of the drill, so that when the plate or ring is urged against the surface of the workpiece, the resultant bore in the workpiece will be normal to the surface plane of the workpiece. In a refinement of such a device, the plate or ring is pivoted so that the bore can be made at an oblique angle to the workpiece. Such prior art devices leave much to be desired. They are cumbersome, and add undesired weight to the drill.

SUMMARY OF THE INVENTION

It is an object of the present invention to provide a method and system which permit the bit of a tool to be quickly and accurately aligned with respect to a workpiece, with considerable precision, and without adding significantly to the weight of the tool. This and other objects of the present invention are accomplished by providing a laser beam source mounted on the tool which emits a beam extending forwardly toward a workpiece along a path substantially parallel to the axis of the bit. Reflector means are provided for disposition on the surface of the workpiece at a preselected angle to the workpiece. The reflector means includes a planar mirror in the path of the beam so as to intercept the incident beam and reflect it backwardly therefrom. Detecting means are disposed between the laser beam source and the planar mirror to detect both the incident beam and its reflected beam, and which provide an indication when the beams are coincident. When the beams are coincident, the bit of the toll will be aligned with considerable precision at the preselected angle to the surface of the workpiece.

In my earlier application, Ser. No. 09/760,634, now abandoned a first embodiment of the present invention was disclosed in which the detector means comprises a translucent screen on which an image of the incident beam and an image of the reflected beam are displayed. When both images are coincident on the screen, so too are the beams, and the tool is properly aligned with the respect to workpiece. In another embodiment, the detector means comprises a screen having a central region which permits transmission of the incident beam through the screen, but which is otherwise opaque. The reflected beam creates an image on the side of the screen facing toward the mirror, which image is visible in the mirror. If the incident beam and the reflected beam are coincident, the image of the reflected beam is subsumed in the incident beam, indicating that the tool is properly aligned with the workpiece.

In yet another embodiment, the detector means comprises a photoelectric cell through which the incident beam passes, resulting in the generation of an electrical signal proportional to the energy of the incident beam. If the incident beam and the reflected beam are coincident, the signal generated by the photoelectric cell will be enhanced by the reflected beam, and the resultant enhanced signal may be used to trigger an audible indication that the tool is properly aligned.

BRIEF DESCRIPTION OF THE DRAWING

The above and other objects and advantages of the present invention will be apparent upon consideration of the following detailed description, taken in conjunction with the accompanying drawings, in which.

DETAILED DESCRIPTION OF THE INVENTION

Figure 1:
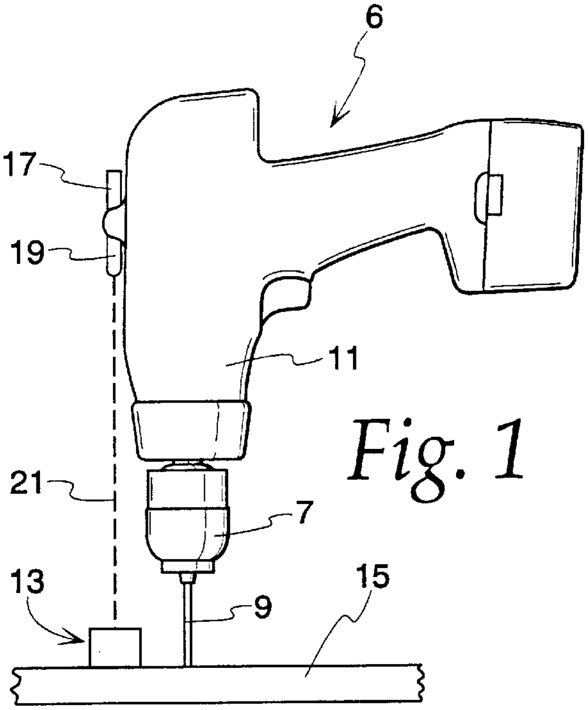
FIG. 1 is a schematic drawing of a first embodiment of apparatus in accordance with the invention for providing a bore in a workpiece which is normal to the surface of the workpiece.

As shown in FIG. 1, there is provided a handheld tool 6, which as illustrated is a battery-powered drill. The drill includes a chuck 7 in which is secured a drill bit 9. The motor and spindle are rotatably received in bearings (not illustrated) held in a housing 11, concentric with the axes of the chuck 7 and bit 9.

There is also provided a reflector means 13 maintained in contact with a planar surface of a workpiece 15. There is further provided a laser beam source 17 supported by a bracket 19. The bracket 19 is advantageously secured to the housing 11, holding the laser beam source 17 in a position to emit a beam 21 extending toward the workpiece essentially parallel to the axis of the bit 9.

Figure 2:
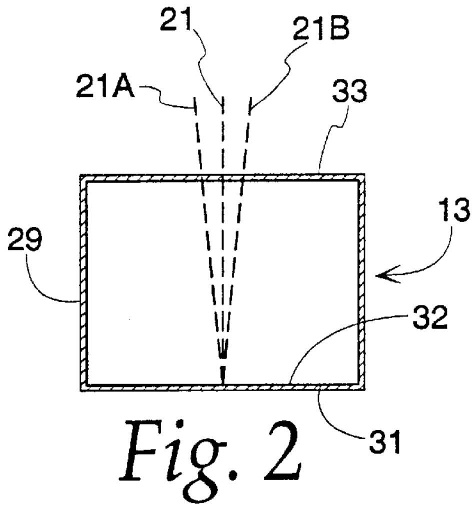
FIG. 2 is an elevational, cross-sectional view of the reflector means of FIG. 1.

As shown more particularly in FIG. 2, the detector means 13 comprises a thin wall cylindrical tube 29, having a bottom wall 31, and a top wall 33. The top wall 33 is a translucent screen on which the laser beam impinges. The bottom wall 31 has a mirrored surface 32, so that light entering the top of the cylindrical tube 29 is reflected backwardly from the mirrored surface 32 toward the top wall 33.

Figure 3:
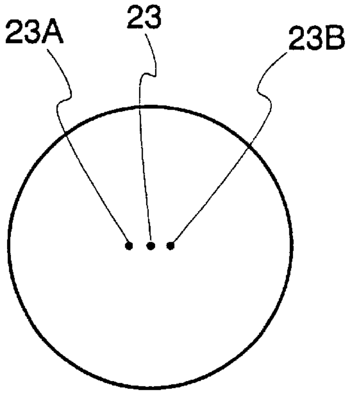
FIG. 3 is a top view of the detector means of FIG. 2.

The laser beam 21 impinging on the screen of the top wall 33 forms an image on the screen, denoted in FIG. 3 by reference numeral 23. When the laser beam 21 is substantially normal to the mirrored surface of the bottom wall 31, the beam 21 is reflected back along the same path as it was emitted from the source 17. As shown in FIG. 3, when so aligned, the image 23 formed by the incident beam 21 on the translucent screen forming the top wall 33 is coincident with the image formed by the reflected beam.

If, however, the axis of the incident beam 21*a* is not normal to the mirrored surface of the bottom wall 31, the reflected beam 21*b* will follow another path so that, as illustrated in FIG. 3, two images will appear, the first image 23*a* being that of incident beam 21*a* and the second image 23*b* being that of reflected beam 21*b*.

It will, therefore, be apparent to a person of ordinary skill that the tool 5 may readily be manipulated so that the incident beam is coincident with the reflected beam, and the bore made by the bit 9 in the workpiece 15 then will be essentially normal to the workpiece.

Figure 4:
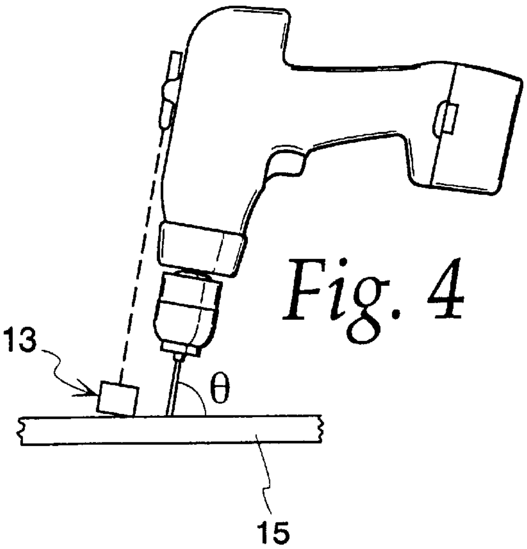
FIG. 4 is a side elevational view of the embodiment of FIG. 1 in which the bore is at a preselected oblique angle to the surface of the workpiece.

If, on the other hand, it is desired that the bore made by the drill 9 be at some other angle θ, as shown in FIG. 4, the reflector means 13 may be pivoted so that the bottom wall 31 is at the same preselected angle θ with respect to the workpiece 15. When the images of the incident laser beam and the reflected beam are coincident on the screen forming the top wall 33, the bore made by the drill 9 in the workpiece 15 will be essentially at the angle θ.

In one mode of operation, the reflector means 13 is manually maintained in contact with the surface of the workpiece by the operator of the drill. Inasmuch as only one hand is usually needed to operate the drill, the other hand may be used to urge the reflector means onto the workpiece. Alternatively, the reflector means may be releasably adhered to the workpiece by double-sided adhesive tape interposed between the reflector means 13 and the workpiece. To prevent inadvertent misplacement of the reflector means, a tether (not illustrated) may be employed to connect the reflector means to the bracket 19.

Figure 5:
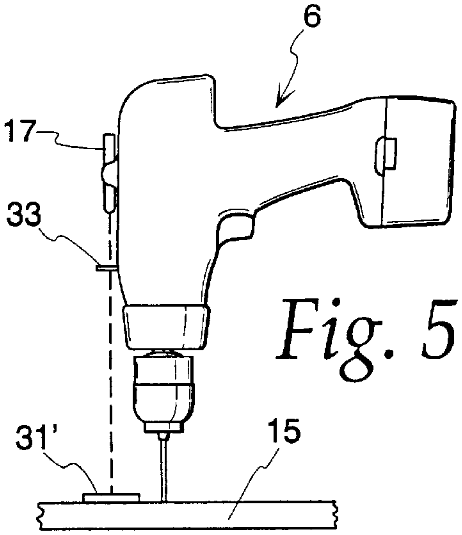
FIG. 5 is a schematic drawing of an alternative construction of the first embodiment of the present invention.

In the alternative embodiment depicted in FIG. 5, a mirror 31' is maintained in contact with the surface of the workpiece 15. The translucent screen 33 is mounted on the body of the drill 6, interposed between the laser beam source 17 and the mirror 31', and provides the same function as that described herein in connection with the translucent screen forming the top wall 33 of the detector means 13 of FIG. 2. This embodiment may be advantageous in that all components of the system except the mirror 31' may be incorporated into the drill 6, either permanently or as an accessory kit for removable attachment thereto.

Figure 6:
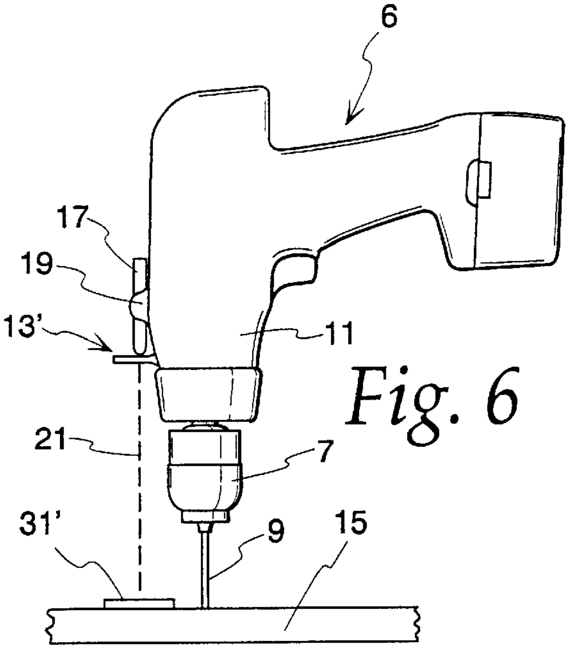
FIG. 6 is a schematic drawing of a second embodiment of apparatus in accordance with the present invention wherein the tool bit is properly aligned with the surface of the workpiece.
Figure 7:
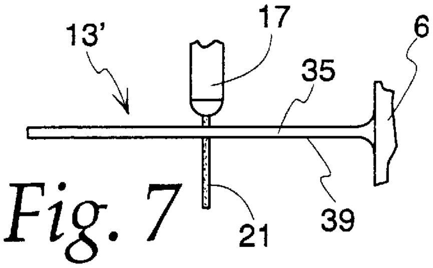
FIG. 7 is an enlarged fragmentary side view of the detector means of FIG. 6.
Figure 8:
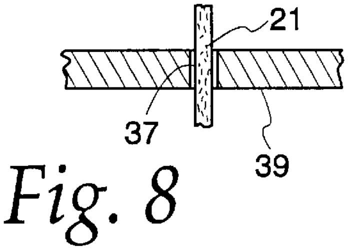
FIG. 8 is an enlarged fragmentary sectional side view of the detector means of FIG. 6.

In the embodiment shown in FIG. 6, the laser beam source 17 is mounted on the tool 6, and detector means 13' is also mounted on the tool 6 forwardly thereof. Detector means 13', as illustrated more particularly in FIG. 7, comprises a plate or disc 35 suitably mounted to the tool 6. The disc 35 is substantially opaque, except for a central region 37 (FIG. 8) which is substantially transparent to the laser beam 21. Preferably, the surface 39 of the disc 35 facing toward the workpiece is a mirrored surface, or at least is substantially reflective.

Figure 10:
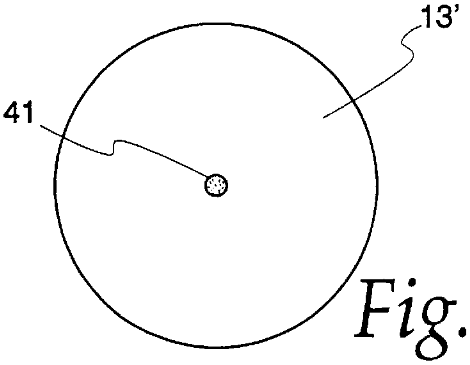
FIG. 10 is a schematic top view of the reflector means of FIG. 6.

As illustrated in FIG. 6, when the axis of the bit 9 of the tool 6 is normal to the surface of the mirror 31', the incident beam passing through the central region 37 of the disc 35 is reflected backwardly from the mirror 31' along the same path as the incident beam. This is indicated by the presence of a single image of the beam on the manner 31', illustrated in FIG. 10 by reference numeral 41.

Figure 9:
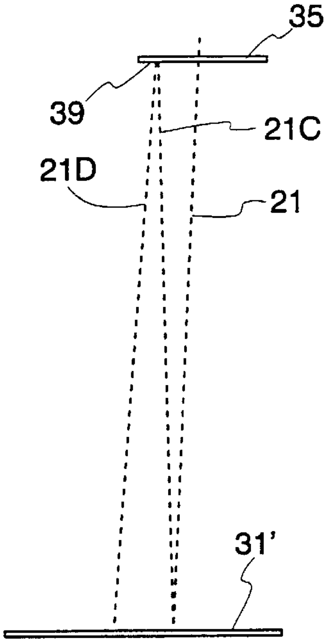
FIG. 9 is a schematic drawing of the embodiment of FIG. 6 wherein the tool bit is misaligned with respect to the surface of the workpiece.
Figure 11:
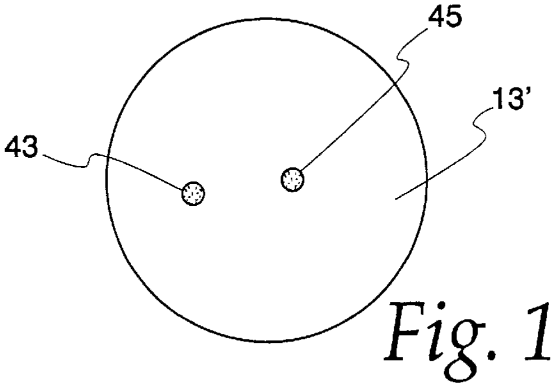
FIG. 11 is a schematic top view of the reflector means of FIG. 9.

If, however, the axis of the bit 9 of the tool is not normal to the mirror 31', as shown diagrammatically in FIG. 9, the incident beam 21 will be reflected backwardly at an oblique angle to the incident beam, to form reflected beam 21*c* which impinges upon the substantially reflective surface 39 of the disc 35. Reflected beam 21*c* is again reflected from surface 39 forwardly toward the mirror as beam 21*d*. Beam 21*d* forms an image 43 on the mirror which is displaced from the image 45 formed by incident beam 21 (FIG. 11). Both images are visible on the mirror 31', and indicate to the person operating the tool 6 that the bit is not normal to the mirror 31'. Indeed, depending on the diameters of the disc 35 and the mirror 31', and on the angle of the beam 21 to the surface of the mirror 31', images of several reflected beams may be visible on the mirror 31'. The several images will be disposed along a line which will indicate to the operator the direction in which the tool should be manipulated to bring the bit to an angle normal to the mirror 31'.

In yet another embodiment (not illustrated) the detection means comprises a photoelectric cell mounted on the tool 6 through which the incident beam 21 passes. The cell generates an electrical signal proportional to the energy of the incident beam. If the incident beam and the reflected beam are coincident, the signal generated by the cell is enhanced by the additional energy of the reflected beam. The resultant enhanced signal may be used in accordance with the skill of the electrical art to trigger an audible signal indicating to the operator that the bit 9 of the tool 6 is normal to the reflector means.

Thus, a method and apparatus for aligning the bit of a hand-held tool with the surface of a workpiece have been described. Those skilled in the art will appreciate that various modifications can be made to embodiments of the present invention described herein without departing from the spirit or scope of the invention, and that the invention is limited only by the claims which follow.

What is claimed is:

1. An alignment system for a hand-held tool having an axial bit to be aligned at a preselected angle to the surface of a workpiece comprising:
   - a laser beam source fixed to the tool emitting a beam extending toward the workpiece along a path substantially parallel to the axis of the bit;
   - a planar mirror positioned on the workpiece surface at said preselected angle thereto and in the path of the beam so as to intercept the incident beam and reflect it therefrom; and
   - detection means disposed between said laser beam source and said planar mirror comprising a translucent screen on which images of both the incident beam and the reflected beam are displayed to enable positioning the bit so that the images are coincident.

2. A method for aligning a hand-held tool having an axial bit at a predetermined angle to the surface of a workpiece, comprising the steps of:
   - providing a laser beam source fixed to the tool emitting a beam extending forwardly toward the workpiece along a path substantially parallel to the axis of the bit;
   - providing a planar mirror on the workpiece surface at said predetermined angle thereto in the path of the beam so as to intercept the incident beam and reflect it backwardly toward the tool; and providing a translucent screen disposed between the laser beam source and the mirror whereon images of both the incident beam and the reflected beam are displayed, and manipulating the tool so that the images are coincident.

* * * * *